United States Patent [19]

Le Pargneux et al.

[11] Patent Number: 4,558,504
[45] Date of Patent: Dec. 17, 1985

[54] PROCESS FOR FABRICATING NUCLEAR REACTOR FUEL ASSEMBLIES FOR LIGHT WATER NUCLEAR REACTORS

[75] Inventors: Jacques Le Pargneux; Michel Bonnamour, both of Lyons; Gérard Filary, Gif sur Yvette, all of France

[73] Assignees: Commissarit a l'Energie Atomique Framatome & Cie, both of Paris, France

[21] Appl. No.: 447,657

[22] Filed: Dec. 7, 1982

[30] Foreign Application Priority Data

Dec. 14, 1981 [FR] France ................. 81 33286

[51] Int. Cl.[4] .............................. B21D 39/00
[52] U.S. Cl. ................... 29/452; 29/400 N; 29/455 R; 29/464; 29/723; 29/DIG. 48; 376/261; 376/438; 376/446
[58] Field of Search ............ 29/DIG. 48, 400 N, 445, 29/455 R, 464, 505, 522 R, 523, 723, 452; 254/290; 376/449, 438, 441, 442, 462, 260, 261

[56] References Cited

U.S. PATENT DOCUMENTS

| | | | |
|---|---|---|---|
| 3,352,003 | 11/1967 | Murtha | 29/464 |
| 3,577,885 | 5/1971 | Wells | 73/150 |
| 3,590,247 | 5/1969 | Holford | 250/83.3 |
| 3,647,184 | 3/1972 | Vanderhurst et al. | 29/452 X |
| 3,791,466 | 2/1974 | Patterson et al. | 376/442 |
| 3,844,023 | 10/1974 | Surribas et al. | 29/452 |
| 3,971,575 | 7/1976 | Lesham et al. | 376/442 X |
| 4,030,975 | 6/1977 | Anthony et al. | 376/442 |
| 4,124,443 | 11/1978 | Bezold | 376/449 X |
| 4,172,117 | 10/1979 | Schober | 424/1 |
| 4,208,248 | 6/1980 | Jabsen | 376/449 |
| 4,326,921 | 4/1982 | Cadwell | 376/449 X |
| 4,376,092 | 3/1983 | Kmonk et al. | 376/449 X |
| 4,405,114 | 9/1983 | Macchi | 376/452 X |
| 4,416,848 | 11/1983 | Feutrel | 376/260 |

FOREIGN PATENT DOCUMENTS 2171279 9/1973 France .
1101142 1/1968 United Kingdom .

Primary Examiner—Howard N. Goldberg
Assistant Examiner—Ronald S. Wallace
Attorney, Agent, or Firm—Kerkam, Stowell, Kondracki and Clarke

[57] ABSTRACT

A tool for the manufacture of a fuel assembly, said tool comprising for each end of an assembly an inner metal plate which can be applied to the bottom of an end member, an outer metal plate which can be displaced, under the action of a jack, along sliding columns fixed to the inner plate, in longitudinal translation with respect thereto and threaded ties traversing corresponding openings in the end member and in the inner and outer plates, able to engage with the internal thread of the guide tubes, and each provided with a head on which is supported a spring for compensating the action of the jack. A method for utilizing the tool is set forth, also.

2 Claims, 6 Drawing Figures

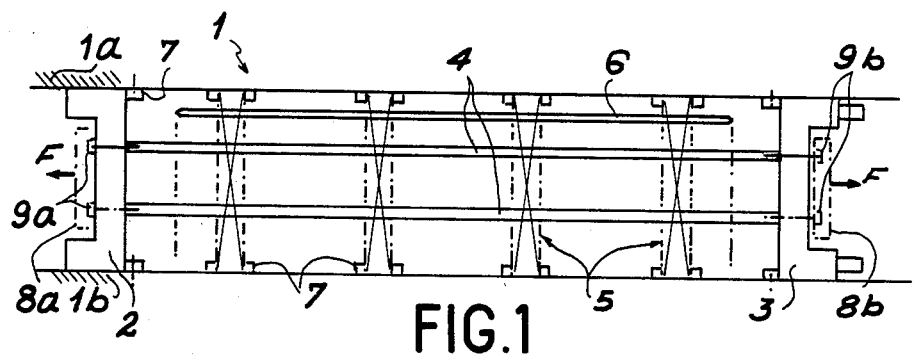
FIG.1
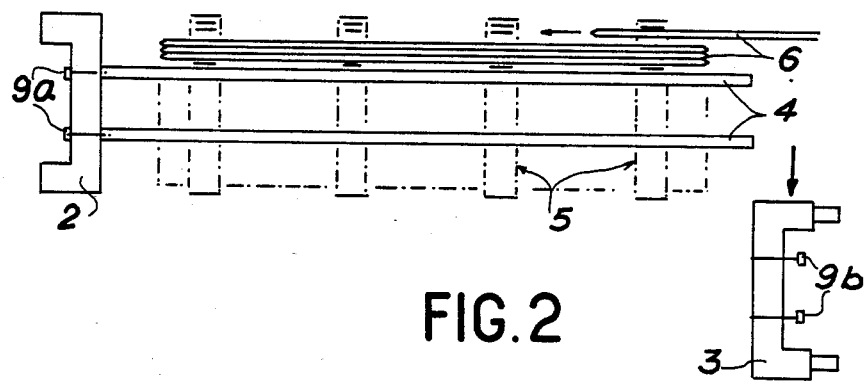
FIG.2
FIG.4
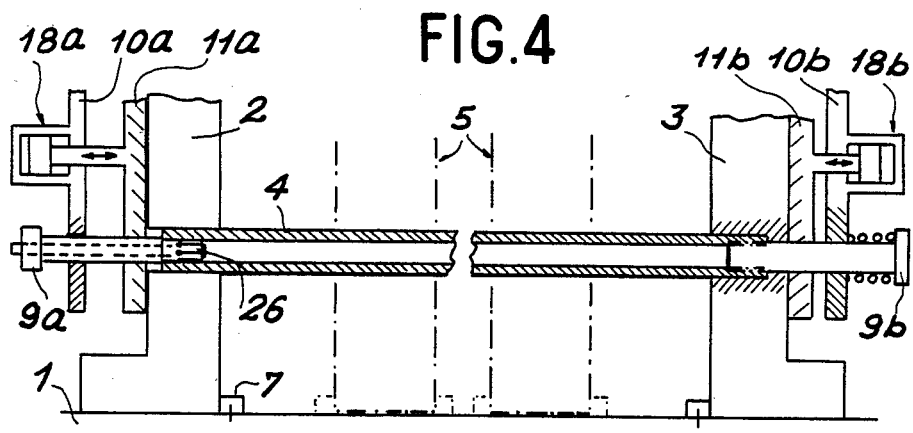

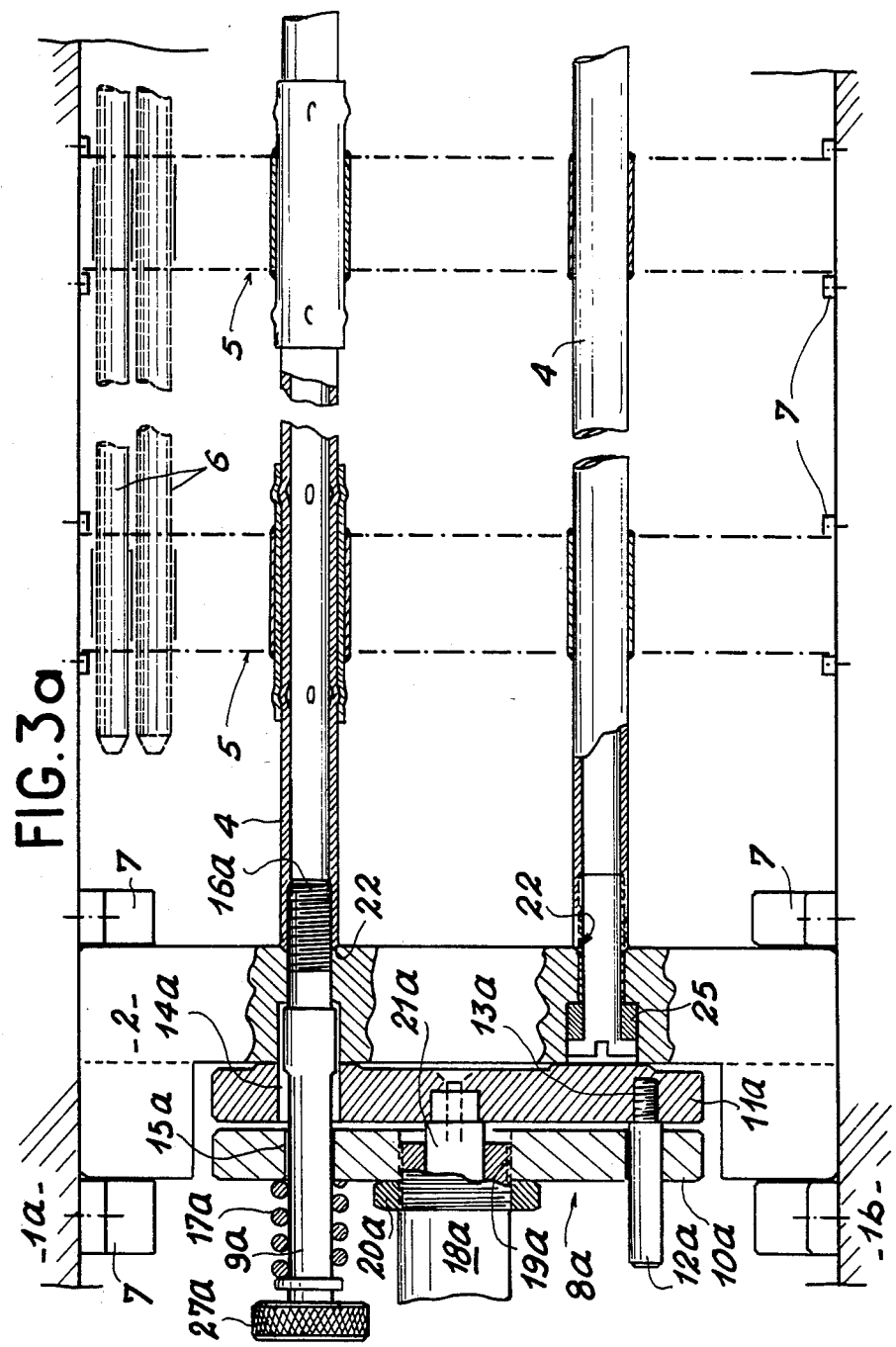

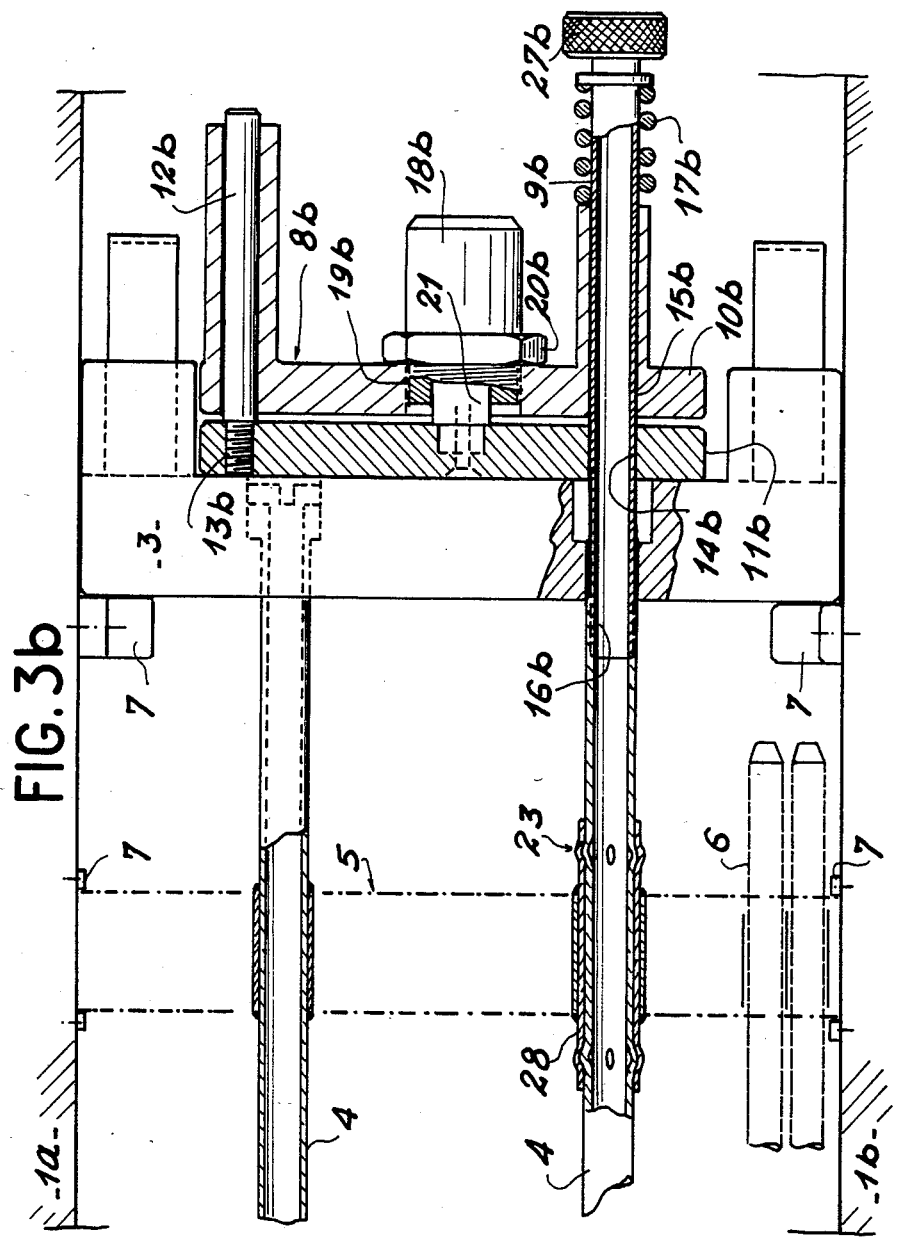

PROCESS FOR FABRICATING NUCLEAR REACTOR FUEL ASSEMBLIES FOR LIGHT WATER NUCLEAR REACTORS

BACKGROUND OF THE INVENTION

The present invention relates to fuel assemblies for a light water nuclear reactor comprising in per se known manner a generally parallelepipedic unit incorporating a large number of elementary rods containing the sheathed fissile fuel material. Such an assembly comprises a skeleton having two solid end members braced by a bundle of hollow guide tubes in which are located control bars and, fixed at regular intervals on the aforementioned guide tubes, a series of spacing members, called grids, in the various square cross-section channels of which the fuel rods are arranged in easy-fit manner. These vertically juxtaposed assemblies forming the active core of a nuclear reactor are immersed in the pressurized cooling water serving to release the heat and conventionally have a length between 4 and 5 meters. The latter dimension, the considerable weight of each of the rods and the lightness of the spacing grids on an industrial scale leads to constructional difficulties, one of the most important of which being described hereinafter.

The connection between the guide tubes and the end members is often realized by screwing threaded members and the intermediate spacing members or grids are rigidly fixed to the guide tubes by welding or a mechanical deformation (expansion) of the guide tubes above and below the grids. In order to produce the skeleton of such a fuel assembly, the tubes are kept fixed to the end members and then the spacing grids are rigidly fixed to the thus fixed tubes. During the operation of fixing the guide tubes to the end members, it is necessary to draw out or stretch the said tubes with a certain predetermined force in order to ensure that the latter are in contact with the end member and thus permit the compensation of the statistical length differences which may exist at the time of manufacture between the various tubes. This fitting of the tubes and their joining to the end members is brought about by a screwed connection, which is a complicated, long operation involving the use of tools making it possible to measure the torques applied. Thus, these torques must be below a limit value, so as to prevent any deterioration of the threads. In order to manufacture such an assembly, the spacing grids are then rigidly fixed to the thus screwed tubes and it is then necessary to dismantle at least one of the end plates in order to be able to fit the fuel rods. This then requires the reinstallation of the plate or plates, whilst obviously taking the same precautions with regards to the torque applied when tightening each screw.

Unfortunately the screwing and tightening of threaded members for bringing about the fixing of the end members to the bundle of guide tubes has always led to a twisting effect in the tubes, due to the introduction of twisting torques. As it is in this state of the tubes that the various spacing grids are rigidly fixed thereto, said twisted state may then be fixed and retained subsequently, which may lead to a permanent geometrical defect of the assembly, which is prejudicial to its good behaviour in the pile, as well as to its strength and operating life.

BRIEF SUMMARY OF THE INVENTION

The present invention relates to a process for producing a fuel assembly for a light water nuclear reactor, which makes it possible to obviate the aforementioned disadvantage with the aid of particularly easily realizable tools.

The present invention more specifically relates to a process for the production of a fuel assembly of a light water nuclear reactor comprising, in per se known manner, two end members braced by hollow guide tubes and which serve to receive control bars and to which are fixed the spacing grids in which are located the fissile fuel rods, of the type in which the end members are fixed by screwing to the guide tubes previously introduced in easy-fit manner into the spacing grids, the final rigid fixing of the spacing grids to the guide tubes is performed, at least one of the end members is disengaged in order to introduce the fuel rods into the recesses which have remained free from spacing grids, followed by the final screwing of the end member or members, wherein the first fixing of the end members to the guide tubes is performed by tensioning the guide tubes without twisting.

Thus, the first or provisional fixing of the guide tubes to the end members takes place by any known means and particularly by screwing, without any torsion or twisting being introduced into the guide tubes, so that it is then possible to fix the spacing grids to said tubes by joining in this way the different parts of the skeleton forming each assembly in a state free from any prejudicial mechanical stresses.

According to an important feature of the invention, the torsion-free fixing of the guide tubes to the end members is carried out by gently screwing to the guide tubes previously arranged between the two end members, followed by the application of a longitudinal tension to at least one of their two ends.

The various parts forming the skeleton of the assembly are precisely positioned on a calibrated assembly bench, so that the longitudinal tension exerted on each of the guide tubes firstly makes it possible to take up statistical variations in length resulting from the actual manufacturing process of the various tubes and in particular ensure their fixing by screwing to the end members without inducing any torsion in the said tubes and without necessitating any long and complicated operations. Under these conditions, the final fixing of the guide tubes to the end members takes place when the said tubes are already rigidly fixed to the spacing grids and obviously after the fitting of the fuel rods. The rigid connections obtained during the fixing of the spacing grids to the guide tubes strongly hold together the said tubes, thus preventing any twisting during the tightening of the final connection screws.

According to a variant of the present invention the provisional fixing of the guide tubes to the end members of the assembly, as well as the longitudinal tensioning of said tubes can be performed by means of an expansible clip or clamp penetrating the ends of the guide tubes in order to ensure their provisional fixing.

The present invention also relates to tools for performing the aforementioned manufacturing process, wherein it comprises for each end of an assembly an inner metal plate which can be applied to the bottom of an end member, an outer metal plate which can be displaced, under the action of a jack, along sliding columns fixed to the inner plate, in longitudinal translation with respect thereto and threaded ties traversing corresponding openings in the end member and in the inner and outer plates, able to engage with the internal thread of the guide tubes, and each provided with a head on which is supported a spring for compensating the action of the jack.

According to a variant of the aforementioned tools, the ties which traverse the corresponding openings in the end members and in the inner and outer plates are equipped at their end with an expansible clip or clamp, which is able to grasp the hollow interior of the corresponding guide tube. In this variant, the guide tubes are fixed to the end members and they are longitudinally tensioned without any screwing, which therefore prevents any danger of twisting the guide tubes prior to the fixing of the spacing grids.

BRIEF DESCRIPTION OF THE DRAWINGS

The invention is described in greater detail hereinafter relative to non-limitative embodiments and with reference to the attached drawings, wherein show:

FIG. 1 the principle of the positioning on a calibrated assembly bench of the various components forming the skeleton of a fuel assembly constructed in accordance with the process according to the invention.

FIG. 2 the following stage of the production of the assembly.

FIGS. 3a and 3b in this order and from left to right, the two ends of a fuel assembly during construction, each being equipped with a tool according to the invention.

FIG. 4 a constructional variant of the tools according to FIGS. 3a and 3b.

DETAILED DESCRIPTION OF THE PREFERRED EMBODIMENTS

Figure 5:
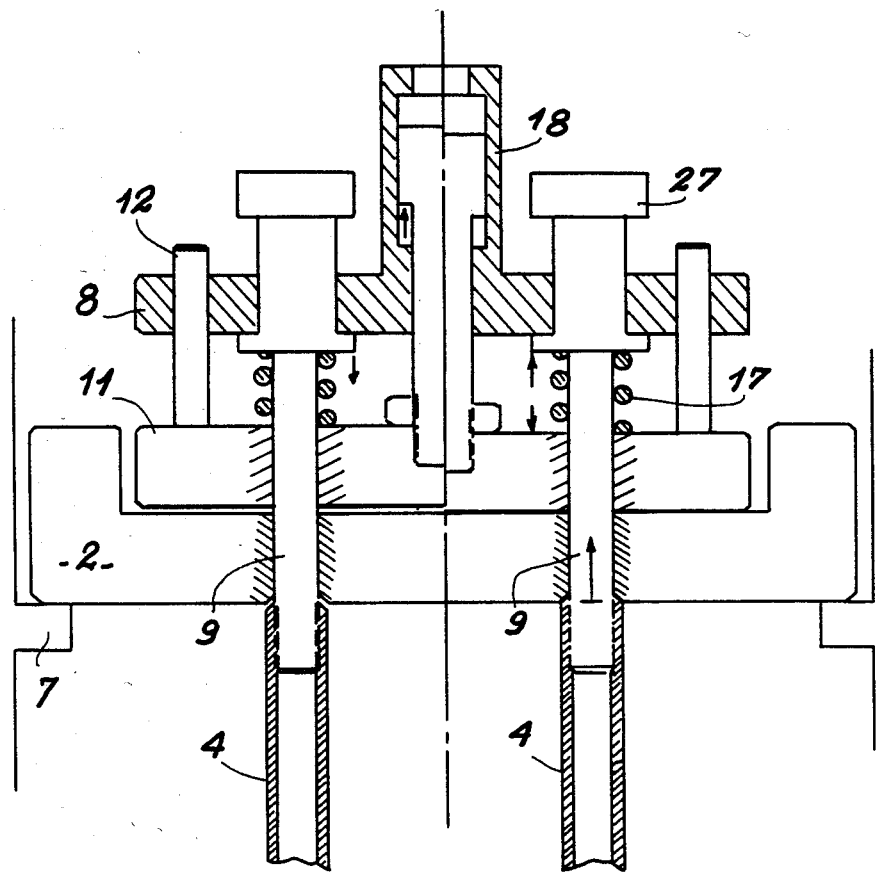
FIG. 5 another constructional variant of the tools of FIGS. 3a and 3b.

In general terms the above drawings show the assembly during manufacture, positioned horizontally of a precalibrated positioning bench. The drawings are in part section and elevation, with the removal of a certain number of members in order to permit better viewing.

FIG. 1 shows an assembly bench 1 constituted by an upper chassis 1a and a lower chassis 1b. Between two chassis there is a skeleton of an assembly having two end members 2 and 3 and a certain number of hollow guide tubes 4. On to guide tubes 4 have been previously placed in easy-fit manner spacing grids 5, diagrammatically shown in dotted line form in the drawing, as well as the location of one of the fuel rods 6, maintained in place by the group of spacing grids 5. On positioning bench 1, the end members 2, and 3, as well as the various spacing grids 5 are accurately positioned by prefitted shims 7. The location of these shims 7 has been selected so as to position beforehand the end members 2 and 3 and the spacing grids 5 in the precise spatial relationship which they will occupy in the finished fuel assembly. According to the invention, two end tools 8a, 8b are fitted into the bottoms of end members 2, 3 and have means 9a, 9b for fixing guide tubes 4 to end members 2, 3. Usually the fixing means are constituted by per se known screwing elements.

According to the process of the invention, a longitudinal tension symbolized by the arrows F is exerted by a means, not shown in FIG. 1, on to each of the tools 8a, 8b, so as to produce a tension of the different guide tubes 4 between the two ends of the assembly. It is then possible to fix the two different spacing grids 5 in their respective positions on the guide tubes 4 by any known means, such as for example welding or beading and bringing about an expansion at each grid. At this time, the skeleton of the assembly shown in FIG. 1 is mechanically stiffened and fixed without any possibility of inducing any prejudicial torsions in it and particularly in guide tubes 4, during the subsequent final screwing thereof to the corresponding end members 2, 3.

The following stages in the manufacture of the assembly can easily be gathered from FIG. 2, where it can be seen that, after disengaging one of the end members, e.g. 3, from the guide tubes 4, the various fuel rods 6 are introduced in easy-fit manner into the recesses of spacing grids 5. When this operation is at an end, it is then merely necessary to place the end member 3 at its stipulated location and to tighten the system by the final screwing of members 9a, 9b, without any risk of deforming tubes 4 or the overall assembly skeleton.

With reference to FIGS. 3a and 3b, a description will now be provided of the possible embodiments of end tools 8a, 8b of FIG. 1, FIGS. 3a and 3b must be studied from left to right and respectively represent two ends of the same assembly during manufacture.

Obviously FIGS. 3a and 3b show the same elements as in FIG. 1, as well as the various fixing shims 7 for end members 2, 3 and spacing grids 5. The corresponding elements of the right and left-hand ends of the assembly carry the same reference numerals, followed by "a" for the left-hand end in FIG. 3a and "b" for the right-hand end in FIG. 3b.

According to the invention, the tools for producing the assembly skeleton are essentially constituted by two moving metal plates, namely outer plate 10a and inner plate 11a for the end of FIG. 3a and 10b (outer) and 11b (inner) for the end of FIG. 3b. These two plates, which are accurately fitted to the bottom of the end members 2, 3 are positioned with respect to one another and are mobile in longtitudinal translation along the general axis of the assembly, as a result of the sliding columns 12a, 12b. These sliding columns 12a, 12b are respectively screwed in corresponding bores 13a, 13b of inner plates 11a, 11b.

Facing each guide tube 4, the inner and outer metal plates 11a, 11b have bores 14a, 14b, corresponding to bores 15a, 15b in the outer metal plates 10a, 10b. Ties 9a, 9b have a threaded head 16a, 16b able to cooperate by screwing with the corresponding ends of guide tubes 4. Tie 9b of FIG. 3b is produced in the form of a hollow rod permitting the passage of an expansion tool, which will be described hereinafter. Between the corresponding head 27a, 27b and the outer metal plate 10a, 10b, there is on each tie 9a,9b a spring 17a, 17b making it possible to apply a longitudinal force to the plates 10a, 10b. A jack 18a, 18b for compressing the aforementioned spring 17a, 17b is screwed into a bore 19a, 19b of the corresponding outer plate 10a, 10b and is immobilized relative to the latter by means of an adjusting nut 20a, 20b. Each of these two jacks 18a, 18b has a piston 21 connected to inner plate 11a, 11b.

The construction shown in FIGS. 3a and 3b operates in the following manner. During a first joining of guide tubes 4 to end members 2, 3 there is a gentle hand screwing of the threaded members 16a, 16b into the also threaded hollow ends of the various guide tubes 4. In the special case of FIGS. 3a and 3b, given in an illustrative and non-limitative manner, end member 2 has, facing each guide tube 4, a conical bearing surface 22 making it possible to align at the same longitudinal translation level all the ends located on the left-hand part of FIG. 3a of the various guide tubes 4. In other words, the taking up of length differences which may exist between one tube 4 and the next is effected by the opposite end of FIG. 3b at end member 3. When this first stage has been performed, using jacks 18a, 18b, springs 17a, 17b are tensioned whilst bringing about the spacing in translation of the outer and inner plates 10a, 11a on the one hand and 10b, 11b on the other, which leads to a longitudinal tensioning of guide tubes 4. Once this tensioning has been carried out, a tool is introduced through the hollow part of ties 9b and as a result the grids 5 are finally fixed to guide tubes 4, either by beading 23 between guide tube 4 and a sleeve 28 welded to the grid, or by any metallurgical joining process, such as welding between guide tube and grid. This fixing at the desired locations of the various assembly grids 5 in a rigid and final manner is performed, whilst the guide tubes 4 are stretched and positioned without any torsion being induced.

Once this operation has been completed, it is possible to release the tension on guide tubes 4 by eliminating the force supplied by jacks 18a, 18b. Ties 9a, 9b are disengaged, by manually unscrewing them, which then makes it possible to dismantle end members 2 and 3 in order to introduce in their place, the various fuel rods 6. It is then merely necessary to replace end members 2, 3 and to tighten them by final screwing, in the manner shown at 25 in FIG. 3a in order to complete the manufacture of the assembly.

FIG. 5 shows another constructional variant of the tools according to the invention. In FIG. 5 it is possible to see all the elements of the embodiment of FIGS. 3a and 3b and which carry the same reference numerals, but on this occasion springs 17a, 17b are positioned between the outer 10a, 10b and inner 11a, 11b metal plates. The operation of this constructional variant is similar to that of the variants described hereinbefore, but the fitting of the springs and of the jack are the opposite to the corresponding functions of FIGS. 3a and 3b.

The thus described tools ensure a fixing between end members and guide tubes without any torsion in the tubes, because it is obtained by a gentle screwing of the threaded elements and the guide tubes are held on each end member with a very precise and identical force for each connection. During the manufacture of the skeleton of an assembly, the use of said tools makes it possible to only form the final screwed connection between the guide tubes and the end members when the latter are rigidly held by the grids.

The use of the process according to the invention also makes it possible to save a considerable amount of time because, during the formation of the first provisional connection between the tubes and the end members, the tensioning of the guide tubes whose statistical length differences are compensated, takes place on a once and for all basis for all the connections through the action of springs 17 and jack 18, without it being necessary to have recourse to tightening tools and tools for measuring the tightening torques, because the guide tubes 4 are connected to ties 9 by gentle screwing.

In FIG. 4, where the same elements carry the same reference numerals as in FIG. 1 or 3, is illustrated a possible variant of the means for provisionally joining the guide tubes 4 to end plates 2, 3. As can be seen in the left-hand part of FIG. 4, tie 9a is terminated by an expansible clip or clamp 26, which makes it possible to grasp the interior of the end of the guide tube 4, without there being any need to effect gentle screwing. This connection makes it possible to realize the longitudinal tensioning of guide tube 4, as in the previous embodiment, so that the other assembly production stages are the same.

What is claimed is:

1. A process for the production of a fuel assembly of a light water nuclear reactor, said fuel assembly having a pair of end pieces, said process comprising the steps of first provisionally fixing guide tubes on the end pieces; placing the guide tubes under longitudinal tension without torsion; rigidly fixing grids on said guide tubes; relaxing the longitudinal tension on the guide tubes; disconnecting at least one of the end pieces from the guide tubes; introducing fuel rods into the grids; and then screwing the guide tubes on the end pieces.

2. The process according to claim 1, further including torsion free screwing the guide tubes between the two end pieces, and thereafter placing the guide tubes under longitudinal tension from at least one of the two ends of the guide tubes.

* * * * *